US010668549B2

(12) United States Patent
Shi et al.

(10) Patent No.: US 10,668,549 B2
(45) Date of Patent: Jun. 2, 2020

(54) RESISTIVE SOLDERING METHOD, ASSEMBLY OF ANTENNA AND GLASS, AND RESISTIVE SOLDERING SYSTEM

(71) Applicants: Ce Shi, Shanghai (CN); Shengwen Yu, Shanghai (CN); Huanhuan Wu, Shanghai (CN)

(72) Inventors: Ce Shi, Shanghai (CN); Shengwen Yu, Shanghai (CN); Huanhuan Wu, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/301,685

(22) PCT Filed: May 4, 2017

(86) PCT No.: PCT/CN2017/082996
§ 371 (c)(1),
(2) Date: Nov. 14, 2018

(87) PCT Pub. No.: WO2017/198073
PCT Pub. Date: Nov. 23, 2017

(65) Prior Publication Data
US 2019/0283162 A1    Sep. 19, 2019

(30) Foreign Application Priority Data
May 20, 2016    (CN) .......................... 2016 1 0342210

(51) Int. Cl.
*B23K 1/00*    (2006.01)
*B23K 103/04*    (2006.01)
(Continued)

(52) U.S. Cl.
CPC .......... *B23K 1/0004* (2013.01); *B23K 1/0008* (2013.01); *B23K 2103/02* (2018.08);
(Continued)

(58) Field of Classification Search
CPC   B23K 1/0004; B23K 1/0008; B23K 2103/04; B23K 2103/52; B23K 2103/54
(Continued)

(56) References Cited

U.S. PATENT DOCUMENTS

| 5,438,338 | A | * | 8/1995 | Thill | ..................... | H01Q 1/1285 |
| | | | | | | 343/700 MS |
| 8,334,474 | B1 | * | 12/2012 | Oatridge | .............. | B23K 11/315 |
| | | | | | | 219/86.22 |
| 2014/0182932 | A1 | * | 7/2014 | Cholewa | .................. | H05B 3/84 |
| | | | | | | 174/84 R |

FOREIGN PATENT DOCUMENTS

| CN | 1211483 A | 3/1999 |
| CN | 103262646 A | 8/2013 |

(Continued)

OTHER PUBLICATIONS

International Search Report as issued in International Patent Application No. PCT/CN2017/082996, dated Aug. 15, 2017.
(Continued)

*Primary Examiner* — Dana Ross
*Assistant Examiner* — Joseph W Iskra
(74) *Attorney, Agent, or Firm* — Pillsbury Winthrop Shaw Pittman LLP

(57) ABSTRACT

A resistive soldering method, assembly of antenna and glass, and resistive soldering system are provided. The method includes providing glass and an antenna component including a base structure and a cylindrical structure having a hole on a front surface of the base structure; forming solder on a surface to be soldered of the glass or a surface to be soldered of the base structure; resistive soldering the surfaces to be soldered of the glass and the base structure to melt the solder, wherein during the resistive soldering process, first and second electrodes are used to apply pressure and heating current to edge portion on the front surface of the base
(Continued)

structure, and a support cylinder is inserted into the hole and applies to the antenna component a pressure for attaching the antenna component to the glass.

24 Claims, 7 Drawing Sheets

(51) Int. Cl.
*B23K 103/00* (2006.01)
*B23K 103/02* (2006.01)

(52) U.S. Cl.
CPC ...... *B23K 2103/04* (2018.08); *B23K 2103/52* (2018.08); *B23K 2103/54* (2018.08)

(58) Field of Classification Search
USPC ..................................................... 219/85.22
See application file for complete search history.

(56) References Cited

FOREIGN PATENT DOCUMENTS

| CN | 103990882 A | | 8/2014 |
|----|-------------|---|--------|
| EP | 1 577 046 A2 | | 9/2005 |
| EP | 1577046 | * | 9/2005 |

OTHER PUBLICATIONS

International Preliminary Report on Patentability and the Written Opinion of the International Searching Authority as issued in International Patent Application No. PCT/CN2017/082996, dated Nov. 20, 2018.

* cited by examiner

RESISTIVE SOLDERING METHOD, ASSEMBLY OF ANTENNA AND GLASS, AND RESISTIVE SOLDERING SYSTEM

CROSS-REFERENCE TO RELATED APPLICATIONS

This application is the U.S. National Stage of PCT/CN2017/082996, filed May 4, 2017, which in turn claims the benefit of priority to Chinese Patent Application No. 201610342210.8, filed on May 20, 2016, and entitled "RESISTIVE SOLDERING METHOD, ASSEMBLY OF ANTENNA AND GLASS, AND RESISTIVE SOLDERING SYSTEM". The content of these applications are incorporated herein by reference in their entireties.

TECHNICAL FIELD

The present disclosure generally relates to a field of soldering of glass and antenna component, and more particularly, to a resistive soldering method, an assembly of antenna and glass, and a resistive soldering system.

BACKGROUND

With the development of technology, more and more additional functions of automotive glass emerge. For example, for the communication effect, automotive glass is often with an antenna function. In order to implement the antenna function and to receive AM/FM signals or other communication signals, an antenna is usually printed on the automotive glass. To enable the antenna on the automotive glass to communicate with external equipment, it is necessary to solder an antenna component onto the printed antenna, so that the external equipment is communicated with the printed antenna via the antenna component, and further the automotive glass possesses the antenna function.

In order to solder the antenna component onto the automotive glass, a soldering method, such as hot iron soldering or hot air soldering, is used. The hot iron soldering uses an electric soldering iron to melt solder tin by a single point in a heat conduction mode, to make the antenna component to be soldered onto the automotive glass. The hot iron soldering method is instable to a certain extent as both a heating time period and a cooling time are controlled manually. The hot air soldering method uses a heater of a soldering torch to heat compressed air or inert gas to a temperature required for melting solder tin, where the heated air or gas is used to heat solder tin of the antenna component so that the solder tin melts, and then the antenna component are soldered onto the automotive glass under a relatively small pressure. By the hot air soldering method, as solder joints are surrounded by a plastic component, the heated air or gas will melt the plastic component, thereby affecting the appearance of products. Additionally, the hot air soldering method has poor flexibility.

Therefore, a new soldering method is needed to implement soldering between a glass and an antenna component.

SUMMARY

In embodiments of the present disclosure, a resistive soldering method, an assembly of antenna and glass, and a resistive soldering system are provided.

Soldering between glass and an antenna component is implemented to form the assembly of antenna and glass with excellent performance.

In an embodiment of the present disclosure, a resistive soldering method is provided, including: providing a glass and an antenna component which includes a base structure and a cylindrical structure, wherein the base structure has a first surface to be soldered and a front surface opposite to the first surface to be soldered, and includes a central portion and an edge portion surrounding the central portion, and the cylindrical structure is located on the central portion on the front surface of the base structure, and has a hole penetrating through a thickness of the cylindrical structure; forming solder on a second surface to be soldered of the glass and/or the first surface to be soldered of the base structure; performing a resistive soldering process to the second surface to be soldered of the glass and the first surface to be soldered of the base structure to melt the solder therebetween, wherein during the resistive soldering process, a first electrode and a second electrode are used to apply a first pressure and provide a heating current to the edge portion on the front surface of the base structure, and a support cylinder is inserted into the hole of the cylindrical structure and adapted to apply to the antenna component a second pressure for attaching the antenna component to the glass; and after the resistive soldering process, performing a cooling treatment to the glass and the antenna component to cool the glass and the antenna component.

A basic idea lies in that during the resistive soldering process, the support cylinder applies to the antenna component the second pressure for attaching the antenna component to the glass, so that the first pressure applied to the base structure by the first and second electrodes may be reduced, which prevents formation of a hot spot at a position of the first and second electrodes under the effect of the heating current and further avoids problems caused by a hot spot, such as crack of the base structure. As a result, an assembly of antenna and glass formed by the resistive soldering process may possess excellent performance.

Further, the support cylinder can fix the antenna component more easily than the first and second electrodes do. Therefore, the support cylinder may not only provide the second pressure but also increase accuracy of fixing the antenna component to the glass.

In another embodiment of the present disclosure, an assembly of antenna and glass is provided, including: an antenna component and a glass, wherein the assembly of antenna and glass is formed by the above resistive soldering method.

A basic idea lies in that formation of a hot spot is avoided during the resistive soldering process and thus crack of the antenna component is avoided, which enables the assembly of antenna and glass to possess excellent performance.

Further, as the supporter cylinder is inserted into the hole of the cylindrical structure and applies the second pressure to the antenna component, the support cylinder can fix the antenna component to the glass more easily than the first and second electrodes do, which increases accuracy of fixing the antenna component to the glass.

In another embodiment of the present disclosure, a resistive soldering system is provided, including: a first electrode; a second electrode; a support cylinder; a resistive soldering joint which is adapted to raise or lower the first electrode, the second electrode and the support cylinder; and a power supply unit which is connected with the first and second electrodes and adapted to supply power to the first and second electrodes.

A basic idea lies in that besides the first electrode and the second electrode, the resistive soldering system further includes the support cylinder which can apply a second pressure to the antenna component and the glass to be soldered during a resistive soldering process, so that a first pressure applied to the antenna component by the first and second electrodes may be reduced, which prevents formation of a hot spot on the antenna component.

DETAILED DESCRIPTION

Figure 1:
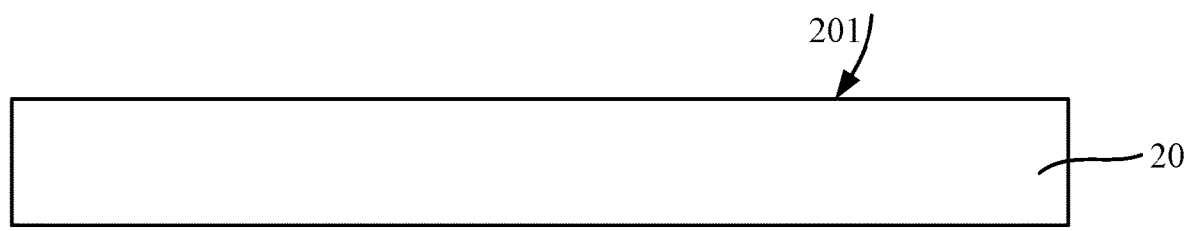
FIG. 1 schematically illustrates a sectional view of a glass according to an embodiment.

As described in the background, a new soldering method is needed to implement soldering between a glass and an antenna component.

Therefore, a resistive soldering process to implement soldering between a glass and an antenna component is proposed. Specifically, two electrodes in a soldering system and an antenna component constitute a conductive heating circuit, and output energy or an output voltage is controlled to melt solder tin on the antenna component, so that the antenna component is soldered on the glass.

However, the resistive soldering process also faces two difficulties. First, as the antenna component is generally a cylindrical structure and electrodes in a soldering system are relatively fine, it is difficult to use the electrodes to fix the antenna component to the glass. That is, fixing the antenna component to the glass is difficult. Second, to successfully implement the soldering, an enough pressure should be applied to the antenna component and the glass. As the pressure is only supplied by two electrodes and a heating current flows through the electrodes and the antenna component during the soldering process, it is prone to form a hot spot at a contact of the antenna component and the electrodes, which leads to crack of the antenna component and affects performance of an assembly of antenna and glass formed by the soldering process.

To solve or mitigate at least one of the above problems, an embodiment of the present disclosure provides a resistive soldering method, including: providing a glass and an antenna component which includes a base structure and a cylindrical structure, wherein the base structure has a first surface to be soldered and a front surface opposite to the first surface to be soldered, and includes a central portion and an edge portion surrounding the central portion, and the cylindrical structure is located on the central portion on the front surface of the base structure, and has a hole penetrating through a thickness of the cylindrical structure; forming solder on a second surface to be soldered of the glass and/or the first surface to be soldered of the base structure; performing a resistive soldering process to the second surface to be soldered of the glass and the first surface to be soldered of the base structure to melt the solder therebetween, wherein during the resistive soldering process, a first electrode and a second electrode are used to apply a first pressure and provide a heating current to the edge portion on the front surface of the base structure, and a support cylinder is inserted into the hole of the cylindrical structure and adapted to apply to the antenna component a second pressure for attaching the antenna component to the glass; and after the resistive soldering process, performing a cooling treatment to the glass and the antenna component to cool the glass and the antenna component.

During the resistive soldering process, the support cylinder applies to the antenna component the second pressure for attaching the antenna component to the glass, so that the first pressure applied to the base structure by the first and second electrodes may be reduced, which prevents formation of a hot spot at a position of the first and second electrodes under the effect of the heating current and further avoids or mitigates problems caused by a hot spot, such as crack of the base structure. As a result, an assembly of antenna and glass formed by the resistive soldering process may possess excellent performance. Further, the support cylinder can fix the antenna component more easily than the first and second electrodes do. Therefore, the support cylinder may not only provide the second pressure but also increase accuracy of fixing the antenna component to the glass.

In order to clarify the object, characteristic and advantages of embodiments of the present disclosure, embodiments of present disclosure will be described clearly in detail in conjunction with accompanying drawings.

Figure 2:
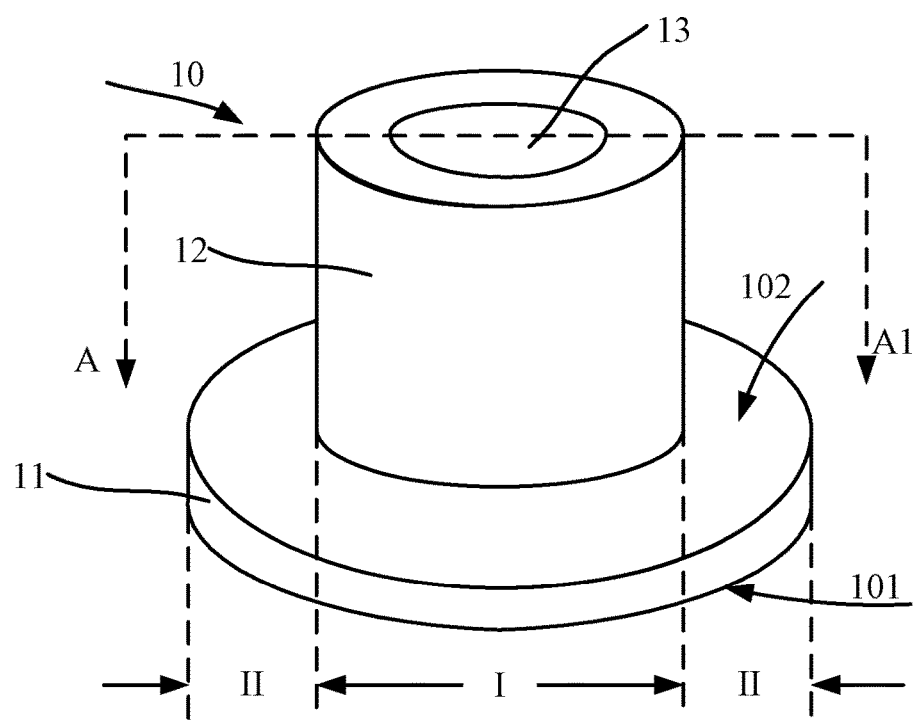
FIGS. 2 and 3 schematically illustrate structural diagrams of an antenna component according to an embodiment.
Figure 3:
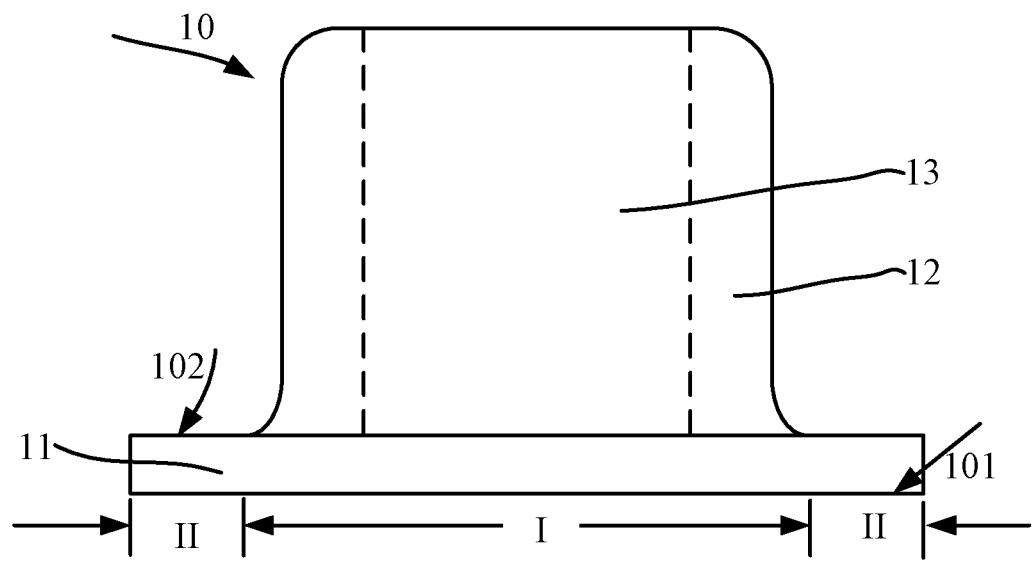

Referring to FIGS. 1 to 3, an antenna component 10 and a glass 20 are provided. The antenna component 10 includes a base structure 11 and a cylindrical structure 12. The base structure 11 has a first surface 101 to be soldered and a front surface 102 opposite to the first surface 101 to be soldered, and includes a central portion I and an edge portion II surrounding the central portion I. The cylindrical structure 12 is located on the central portion I on the front surface 102 of the base structure 11, and has a hole 13 penetrating through a thickness of the cylindrical structure 12.

FIG. 1 schematically illustrates a sectional view of the glass 20, FIG. 2 schematically illustrates a structural stereogram of the antenna component 10, and FIG. 3 schematically illustrates a sectional view of the antenna component 10 along AA1 direction as shown in FIG. 2.

In some embodiments, the glass 20 may be a single-layer glass or a laminated glass. The glass 20 is an automotive glass and has a second surface 201 to be soldered on which the antenna component 10 is soldered subsequently. A shape of the second surface 201 to be soldered may be a circle, a triangle or a polygon. In the embodiment, the shape of the second surface 201 to be soldered is a circle as an example.

In some embodiments, a sectional shape of the base structure 11 on a horizontal direction may be a circle. In some embodiments, the sectional shape of the base structure 11 on the horizontal direction may be an ellipse or a polygon, such as a quadrangle, a hexagon or an octagon. The central portion I of the base structure 11 has the cylindrical structure 12 formed thereon. During a subsequent resistive soldering process, a first electrode and a second electrode contact with the edge portion II, so as to provide a heating current to the base structure 11.

In some embodiments, the central portion I of the base structure 11 may be solid. Thus, a bottom of the hole 13 of the cylindrical structure 12 exposes the central portion I on the front surface 102 of the base structure 11. In some embodiments, the central portion of the base structure may be hollow, and the hollow central portion and the hole penetrate each other. In the embodiment, the central portion I on the front surface 102 of the base structure 11 may be aligned with the edge portion II on the front surface 102 of the base structure 11. In some embodiments, the central portion on the front surface of the base structure may be lower or higher than the edge portion on the front surface of the base structure.

After the antenna component 10 and the glass 20 are soldered subsequently, on a sectional surface parallel with the second surface 201 to be soldered of the glass 20, the hole 13 of the cylindrical structure 12 has a diameter within a range from 3 centimeters to 5 centimeters, the cylindrical structure 12 has a diameter within a range from 4 centimeters to 8 centimeters, and the base structure 11 has a diameter within a range from 5 centimeters to 10 centimeters.

Figure 4:
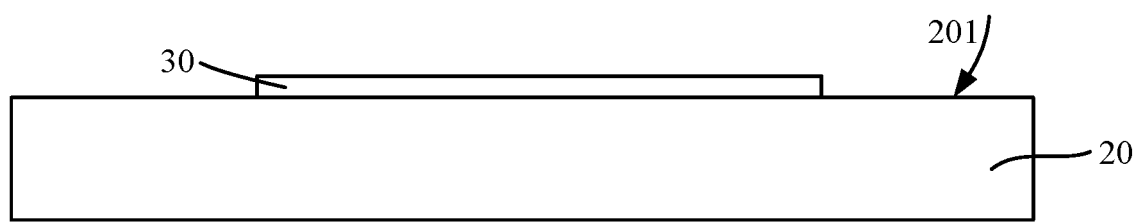
FIG. 4 schematically illustrates a sectional view of forming solder on a surface to be soldered of a glass according to an embodiment.

Referring to FIG. 4, solder 30 is formed on the second surface 201 to be soldered of the glass 20.

The solder 30 may include solder tin which may further include silver and lead. In some embodiments, an area of the formed solder 30 may be determined according to an area of the first surface 101 to be soldered of the base structure 11.

In some embodiments, solder may not be formed on the second surface to be soldered of the glass but only formed on the first surface to be soldered of the base structure. In some embodiments, solder may be formed on both the second surface to be soldered of the glass and the first surface to be soldered of the base structure.

A subsequent process may include: performing a resistive soldering process to the second surface 201 to be soldered of the glass 20 and the first surface 101 to be soldered of the base structure 11 to melt the solder 30 therebetween.

Figure 5:
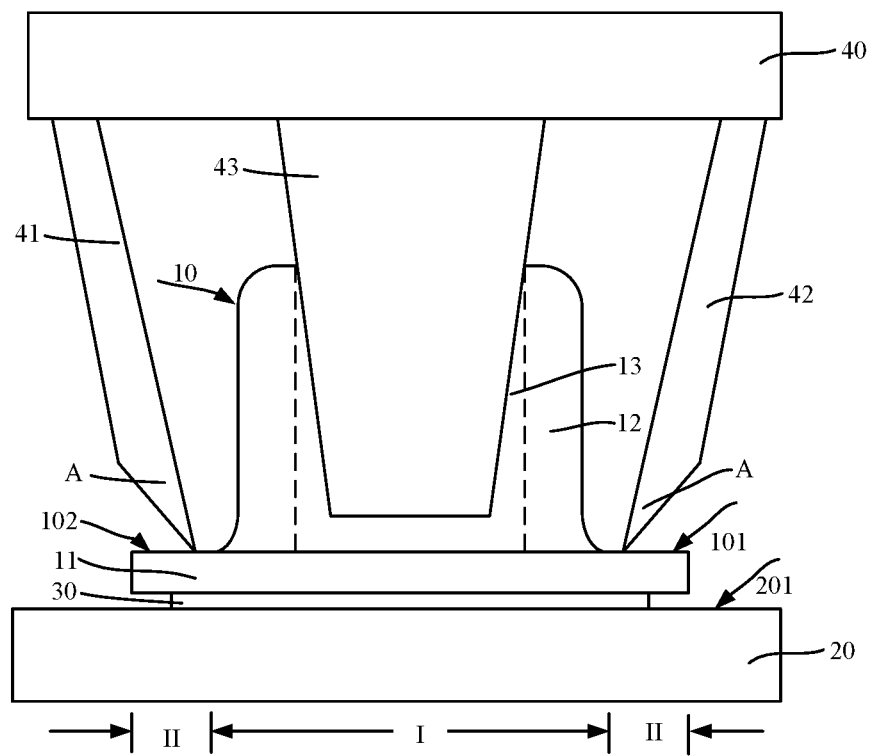
FIGS. 5 to 9 schematically illustrate structural diagrams of an antenna component, a glass, a first electrode, a second electrode and a support cylinder during a resistive soldering process according to different embodiments.

Referring to FIG. 5, the antenna component 10 is attached to the glass 20.

In some embodiments, a support cylinder 43 is inserted into the hole 13 of the cylindrical structure 12 and adapted to apply to the antenna component 10 a second pressure for attaching the antenna component 10 to the glass 20, and a first electrode 41 and a second electrode 42 are used to apply a first pressure to the edge portion II on the front surface 102 of the base structure 11.

Before a heating current is provided subsequently, the second surface 201 to be soldered of the glass 20 is attached to the first surface 101 to be soldered of the base structure 11, to prevent relative displacement between the antenna component 10 and the glass 20 from being generated when the heating current is provided subsequently, which may enhance the attachment of the antenna component 10 and the glass 20. It should be noted that, although there is solder 30 between the second surface 201 to be soldered of the glass 20 and the first surface 101 to be soldered of the base structure 11, the relation between the second surface 201 to be soldered of the glass 20 and the first surface 101 to be soldered of the base structure 11 can still be considered as attachment.

The glass 20 is disposed on a support platform, and a first pressure is applied to the edge portion II on the front surface 102 of the base structure 11 via the first electrode 41, the second electrode 42 and the support cylinder 43. In some embodiments, a resistive soldering system is utilized to attach the antenna component 10 to the glass 20.

In some embodiments, attaching the antenna component 10 to the glass 20 may include: using the first electrode 41 and the second electrode 42 to apply a first pressure to the edge portion II on the front surface 102 of the base structure 11; and providing a support cylinder 43 which is inserted into the hole 13 of the cylindrical structure 12 and adapted to apply to the antenna component 10 a second pressure for attaching the antenna component 10 to the glass 20.

It should be noted that, during the process of attaching the antenna component 10 to the glass 20, not only the first electrode 41 and the second electrode 42 but also the support cylinder 43 can fix the antenna component 10 to the glass 20. Therefore, compared with existing techniques where only the first electrode and the second electrode are used to fix the antenna component to the glass, the process of attaching the antenna component 10 to the glass 20 in embodiments of the present disclosure may improve accuracy of fixing the antenna component 10 to the glass 20.

In some embodiments, during the process of attaching the antenna component 10 to the glass 20, first, the support cylinder 43 applies to the antenna component 10 the second pressure for attaching the antenna component 10 to the glass 20; afterwards, the first electrode 41 and the second electrode 42 contact with the edge portion II on the front surface 102 of the base structure 11, so that the first electrode 41 and the second electrode 42 apply to the antenna component 10 the first pressure for attaching the antenna component 10 to the glass 20. Advantages lie in that the support cylinder 43 can fix the antenna component 10 and provide better fixing effect than the first electrode 41 and the second electrode 42. Therefore, by using the support cylinder 43 to apply the second pressure to the antenna component 10 first, the first electrode 41 and the second electrode 42 may fix the antenna component 10 more easily.

In some embodiments, the first electrode and the second electrode may apply a first pressure to the antenna component first, and the support cylinder may apply a second pressure to the antenna component afterwards.

The first electrode 41, the second electrode 42 and the support cylinder 43 are connected with a resistive soldering joint 40. By raising or lowering the resistive soldering joint 40, the first electrode 41, the second electrode 42 and the support cylinder 43 are raised or lowered correspondingly. The first electrode 41, the second electrode 42 and the support cylinder 43 are described in detail in a subsequent resistive soldering process.

To improve resistive soldering efficiency and shorten a time period of the subsequent resistive soldering process, before a heating current is provided subsequently, a pre-heating treatment may be performed to the glass 20 and the antenna component 10, so that a temperature of the glass 20, the antenna component 10 and the solder 30 may be relatively high before resistive soldering, which may shorten a temperature difference with a melting temperature of the solder 30 in the subsequent resistive soldering process.

If a heating temperature in the pre-heating treatment is too low, a time period required for raising the temperature of the solder 30 to the melting temperature in the subsequent resistive soldering process may be relatively long; and if a heating temperature in the pre-heating treatment is too high, the solder 30 may be melt. Therefore, in some embodiments, the heating temperature in the pre-heating treatment may be within a range from 50° C. to 110° C.

Figure 6:
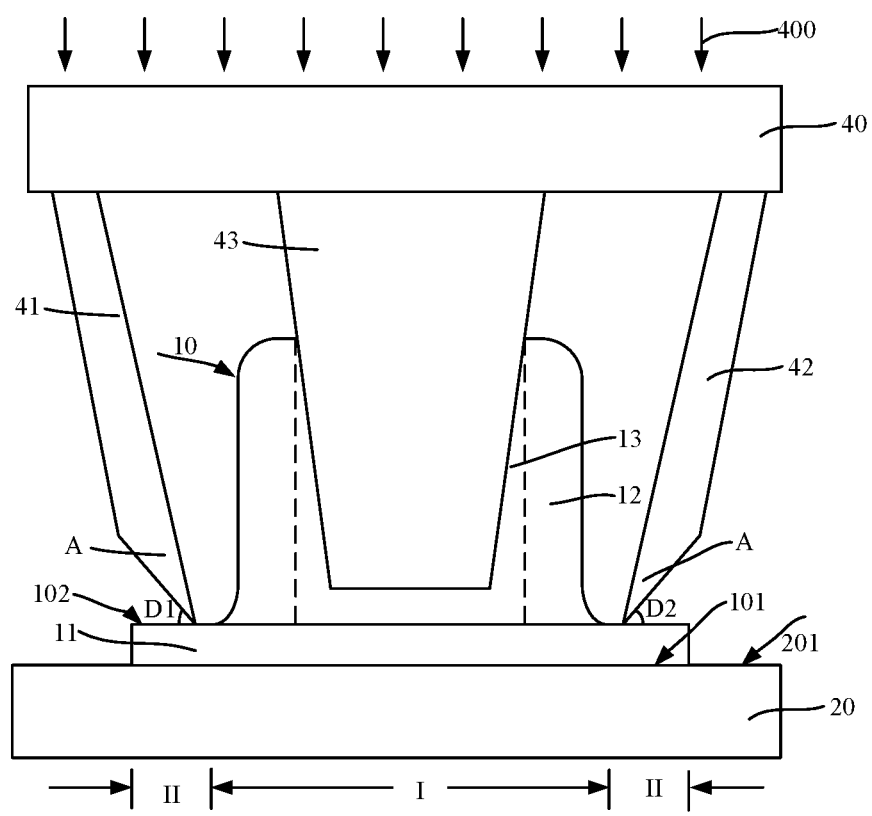

Referring to FIG. 6, a resistive soldering process 400 is performed to the second surface 201 to be soldered of the glass 20 and the first surface 101 to be soldered of the base structure 11 to melt the solder 30 (referring to FIG. 5) therebetween.

In some embodiments, the first electrode 41, the second electrode 42 and the support cylinder 43 may be connected via the resistive soldering joint 40.

During the resistive soldering process 400, the first electrode 41 and the second electrode 42 are used to apply a first pressure and provide a heating current to the edge portion II on the front surface 102 of the base structure 11, and a support cylinder 43 is inserted into the hole 13 of the cylindrical structure 12 and adapted to apply to the antenna component 10 a second pressure for attaching the antenna component 10 to the glass 20.

During the resistive soldering process 400, the glass 20 is disposed on a support platform (not shown in Figures), and the first electrode 41, the second electrode 42 and the antenna component 10 constitute a conductive heating circuit to provide the heating current to the bases structure 11, so that the solder 30 between the base structure 11 and the glass 20 is heated to be melt. In the embodiments, not only the first electrode 41 and the second electrode 42 but also the support cylinder 43 applies a pressure to the base structure 11. Therefore, a pressure applied to the base structure 11 by the first and second electrodes may be reduced, which prevents a hot spot from being formed on the base structure 11 during the resistive soldering process 400 and further avoids crack of the base structure 11 caused by a hot spot.

During the resistive soldering process 400, as the support cylinder 43 is inserted into the hole 13 of the cylindrical structure 12, the support cylinder 43 may be further adapted to fix the antenna component 10 to the glass 20. Therefore, in some embodiments, the antenna component 10 is fixed by the first electrode 41, the second electrode 42 as well as the support cylinder 43, which may improve accuracy of fixing the antenna component 10 during the resistive soldering process 400. Besides, as the support cylinder 43 applies to the antenna 10 the second pressure for attaching the antenna component 10 to the glass 20, the possibility of generating a relative displacement between the antenna component 10 and the glass 20 may be reduced under the effect of the second pressure. That is, the support cylinder 43 is further adapted to reduce relative displacement of the antenna component 10 and the glass 20.

During the resistive soldering process 400, it is required that the first electrode 41 and the second electrode 42 do not contact a sidewall of the cylindrical structure 12, to avoid negative effect to the appearance of the cylindrical structure 12. Therefore, in some embodiments, during the resistive soldering process 400, an angle D1 between the first electrode 41 and the front surface 102 of the base structure 11 is not greater than 90°, a distance between the first electrode 41 and the cylindrical structure 12 gradually increases along a direction from a bottom to a top of the hole 13 of the cylindrical structure 12, an angle D2 between the second electrode 42 and the front surface 102 of the base structure 11 is not greater than 90°, and a distance between the second electrode 42 and the cylindrical structure 12 gradually increases along the direction from the bottom to the top of the hole 13 of the cylindrical structure 12.

The angle D1 between the first electrode 41 and the front surface 102 of the base structure 11 should not be too small, to avoid a relative displacement of the first electrode 41 on the front surface 102 of the base structure 11 during the resistive soldering process 400. Similarly, the angle D2 between the second electrode 42 and the front surface 102 of the base structure 11 should not be too small as well. Therefore, in some embodiments, during the resistive soldering process 400, the angle D1 between the first electrode 41 and the front surface 102 of the base structure 11 may be within a range from 45° to 90°, and the angle D2 between the second electrode 42 and the front surface 102 of the base structure 11 may be within a range from 45° to 90°.

In some embodiments, the angle D1 between the first electrode 41 and the front surface 102 of the base structure 11 may be within a range from 55° to 80°, and the angle D2 between the second electrode 42 and the front surface 102 of the base structure 11 may be within a range from 55° to 80°.

The antenna component 10 may have a relatively small size. To reduce a contact area between the first and second electrodes and the base structure 11, the first electrode 41 may have a falling wedge-shaped end A. During the resistive soldering process 400, a tip of the falling wedge-shaped end A of the first electrode 41 may contact with the edge portion II on the front surface 102 of the base structure 11. The second electrode 42 may also have a falling wedge-shaped end A. During the resistive soldering process 400, a tip of the falling wedge-shaped end A of the second electrode 42 may contact with the edge portion II on the front surface 102 of the base structure 11.

It should be noted that, in some embodiments, the first and second electrodes may not have a falling wedge-shaped end. For example, the first and second electrodes may have a fine cylindrical end.

During the resistive soldering process 400, as the support cylinder 43 is located beyond the conductive heating circuit constituted by the first electrode 41, the second electrode 42 and the antenna component 10, the heating current does not flow through the support cylinder 43, and thus a current is not provided to the base structure 11 when the support cylinder 43 contacts with the base structure 11. Therefore, a material of the support cylinder 43 may be insulating or conductive. In some embodiments, the material of the support cylinder 43 may include a ceramic, resinous, metal or alloyed material.

In some embodiments, the hole 13 of the cylindrical structure 12 may be a through hole. To ensure the support cylinder 43 to be inserted into the through hole 13, on a sectional surface parallel with the second surface 201 to be soldered of the glass 20, a diameter of a first portion of the support cylinder 43 being inserted into the through hole 13 is smaller than a diameter of the through hole 13. The support cylinder 43 provided in embodiments of the present disclosure is described in detail in conjunction with figures below.

FIG. 6 schematically illustrates a sectional structural diagram of the support cylinder 43 and the antenna component 10 according to an embodiment.

During the resistive soldering process 400, length of the first portion of the support cylinder 43 being inserted into the hole 13 (or called the through hole 13) is smaller than or equal to depth of the hole 13, and the top of the hole 13 is in contact with the support cylinder 43 so that the top of the hole 13 gets stuck with the support cylinder 43.

In some embodiments, along a direction from the bottom to the top of the hole 13 of the cylindrical structure 12, a diameter of the first portion of the support cylinder 43 being inserted into the hole 13 gradually increases on a sectional surface parallel with the second surface 201 to be soldered of the glass 20, and a diameter of a second portion of the support cylinder 43 being contacting with the top of the hole 13 is greater than a diameter of the top of the hole 13.

In FIG. 6, the central portion I of the base structure 11 is solid. In some embodiments, the central portion of the base structure may be hollow.

Figure 7:
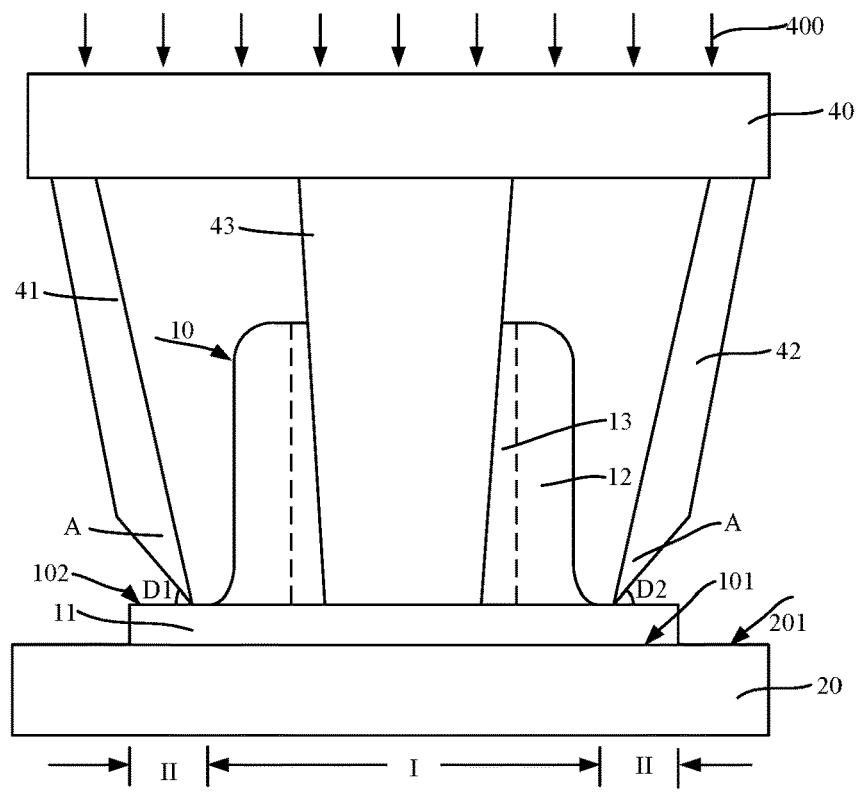

FIG. 7 schematically illustrates a sectional structural diagram of the support cylinder 43 and the antenna component 10 according to another embodiment.

During the resistive soldering process 400, the support cylinder 43 inserted into the through hole 13 is in contact with the front surface 102 of the base structure 11. The central portion I on the front surface 102 of the base structure 11 is solid, and the support cylinder 43 is in contact with the central portion I on the front surface 102 of the base structure 11. The top of the through hole 13 is in contact with the support cylinder 43 so that the top of the through hole 13 gets stuck with the support cylinder 43. In some embodiments, the top of the through hole 13 may not be in contact with the support cylinder 43.

Figure 8:
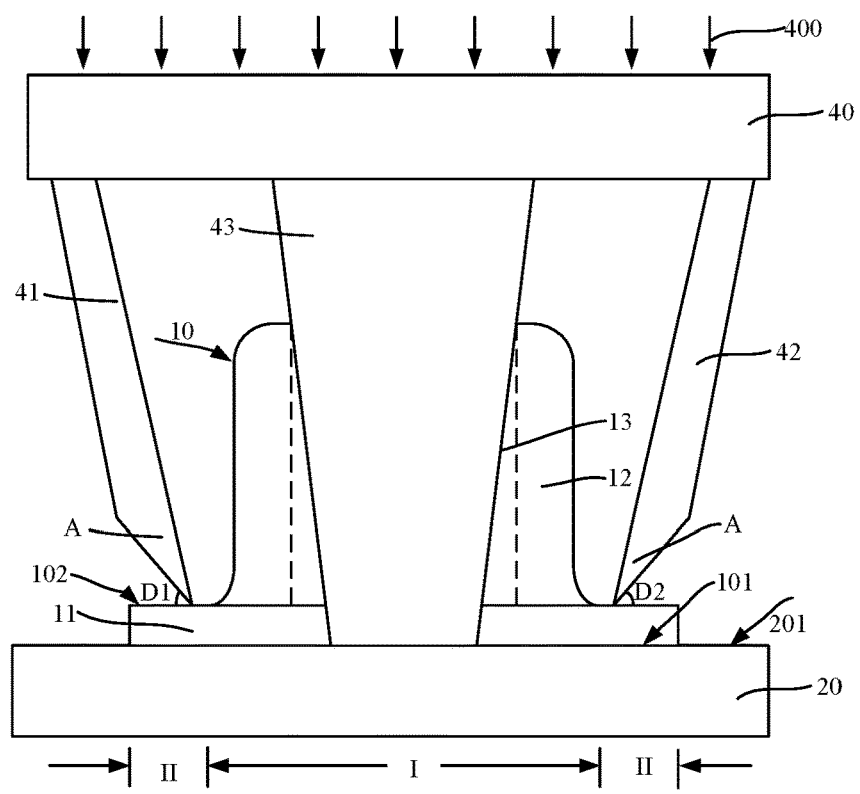

FIG. 8 schematically illustrates a sectional structural diagram of the support cylinder 43 and the antenna component 10 according to another embodiment.

During the resistive soldering process 400, the support cylinder 43 inserted into the hole 13 is in contact with the front surface 102 of the base structure 11. The central portion I of the base structure 11 is hollow to ensure a pressure can be applied to the antenna component 10 by the support cylinder 43, and the top of the hole 13 is in contact with the support cylinder 43 so that the top of the hole 13 gets stuck with the support cylinder 43. In some embodiments, length of the first portion of the support cylinder 43 being inserted into the hole 13 is greater than, smaller than or equal to depth of the hole 13.

Figure 9:
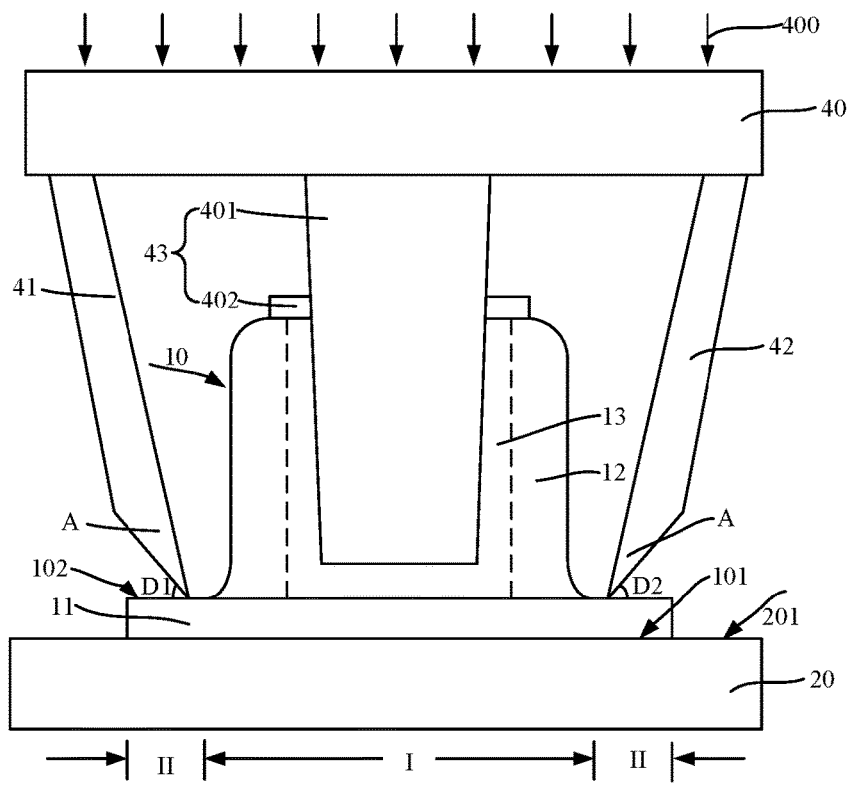

FIG. 9 schematically illustrates a sectional structural diagram of the support cylinder 43 and the antenna component 10 according to another embodiment.

During the resistive soldering process 400, length of the first portion of the support cylinder 43 being inserted into the through hole 13 is smaller than or equal to depth of the through hole 13, and the top of the through hole 13 is in contact with the support cylinder 43 so that the top of the through hole 13 gets stuck with the support cylinder 43.

The support cylinder 43 includes a central axial structure 401 and a bump structure 402 on the periphery of the central axial structure 401. A bottom of the bump structure 402 presses against the top of the through hole 13. In some embodiments, the bump structure 402 may be an annular structure surrounding the periphery of the central axial structure 401. In some embodiments, the bump structure 402 may include at least two separate bumps.

In FIG. 9, the central portion I of the base structure 11 is solid. In some embodiments, the central portion of the base structure may be hollow.

If the heating current is too low, energy generated by the heating current may not be strong enough to melt the solder 30; and if the heating current is too large, energy generated by the heating current may be too strong to degrade performance of the antenna component 10 or the glass 20, or invalidate the antenna component 10 or the glass 20. In some embodiments, the heating current may be within a range from 120 A to 150 A.

During the resistive soldering process 400, the second pressure applied to the antenna component 10 by the support cylinder 43 cannot be too small. Otherwise, to ensure the soldering to be performed successfully, the first electrode 41 and the second electrode 42 still need to apply a relatively large pressure to the antenna component 10, which may cause a hot spot to be generated during the soldering and further increase the risk of crack of the antenna component 10.

Therefore, in some embodiments, the second pressure applied to the antenna component 10 by the support cylinder 43 may be no less than 10N.

In some embodiments, a time period of the resistive soldering process 400 may be within a range from 1.5 S to 3 S. It should be noted that, the time period of the resistive soldering process 400 may be related to performance of a material of the solder 30, the number of the solder 30, the heating current, a material and a shape of the first electrode 41, a material and a shape of the second electrode 42 and etc. The time period of the resistive soldering process 400 may be different according to selected parameters. The time period of the resistive soldering process 400 should at least enable the resistive soldering between the glass 20 and the antenna component 10 to be finished.

Referring to FIGS. 6 to 10, after the resistive soldering process 400, a cooling treatment is performed to the glass 20 and the antenna component 10 to cool the glass 20 and the antenna component 10 to form an assembly 300 of antenna and glass.

In some embodiments, the first electrode 41 and the second electrode 42 may stop providing the heating current to the edge portion II on the front surface 102 of the base structure 11, and continue applying the first pressure to the edge portion II on the front surface 102 of the base structure 11, and the support cylinder 43 may continue applying to the antenna component 10 the second pressure for attaching the antenna component 10 to the glass 20.

In some embodiments, a time period of the cooling treatment may be within a range from 4 S to 6 S, such as 5 S.

It should be noted that, besides stop providing the heating current, an air cooling process may be further performed to shorten a wait time period.

The assembly 300 of antenna and glass formed by the resistive soldering method provided in an embodiment of the present disclosure has excellent performance. By using the support cylinder 43 to apply a second pressure to the antenna component 10, a first pressure applied to the antenna component 10 by the first and second electrodes may be reduced, which prevents a hot spot from being formed at a position of the first and second electrodes on the front surface 102 of the base structure 11 and further avoids or mitigates crack of the base structure 11 caused by a hot spot. In this way, the antenna component 10 may keep good appearance and performance. Besides, the support cylinder 43 may further fix the antenna component 10 to the glass 20, which may improve accuracy of fixing the antenna component 10 to the glass 20. Additionally, the support cylinder 43 is further adapted to reduce relative displacement of the antenna component 10 and the glass 20, and this may further improve accuracy of fixing the antenna component 10 to the glass 20.

As the first electrode 41 and the second electrode 42 apply the first pressure and provide the heating current to the base structure 11 of the antenna component 10 during the resistive soldering process, in the assembly 300 of antenna and glass, the edge portion II on the front surface 102 of the base structure 11 has two pinholes 01 whose positions are corresponding to positions of the first and second electrodes during the resistive soldering process.

Figure 10:
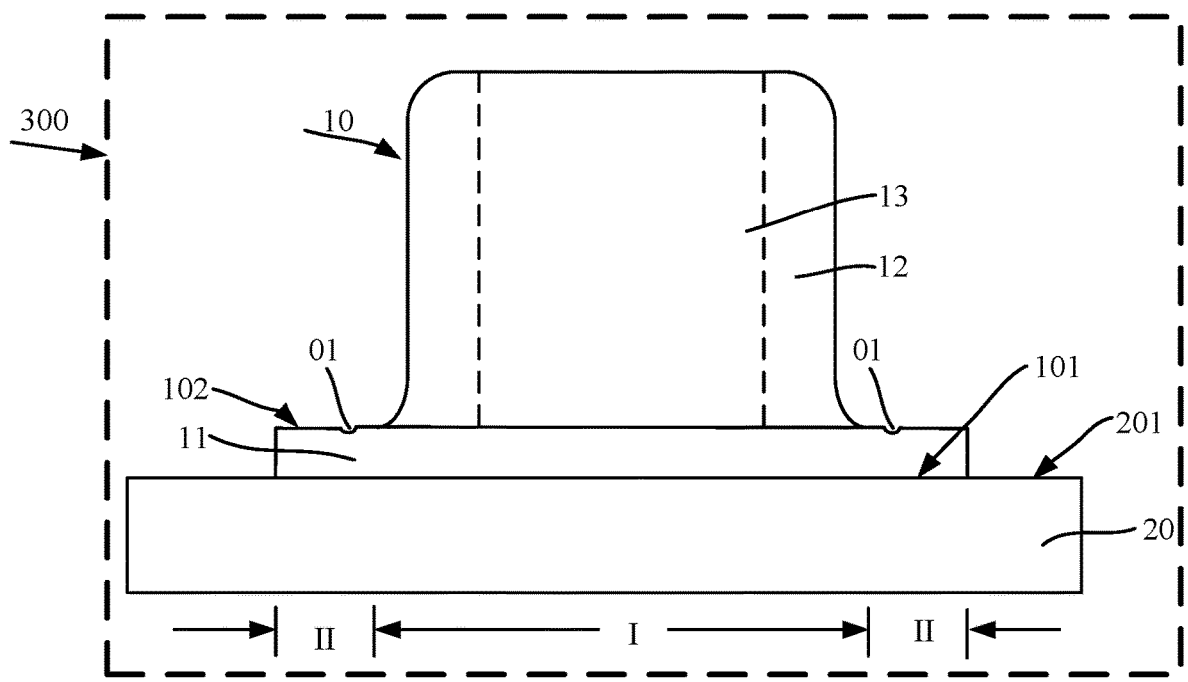
FIG. 10 schematically illustrates a sectional view of an assembly of antenna and glass according to an embodiment.

In an embodiment, an assembly of antenna and glass is provided. Referring to FIG. 10, the assembly 300 of antenna and glass includes an antenna component 10 and a glass 20, wherein the assembly 300 of antenna and glass is formed by the above resistive soldering method, and the edge portion II on the front surface 102 of the base structure 11 has two pinholes 01 whose positions are corresponding to positions of the first and second electrodes during the resistive soldering process.

Figure 11:
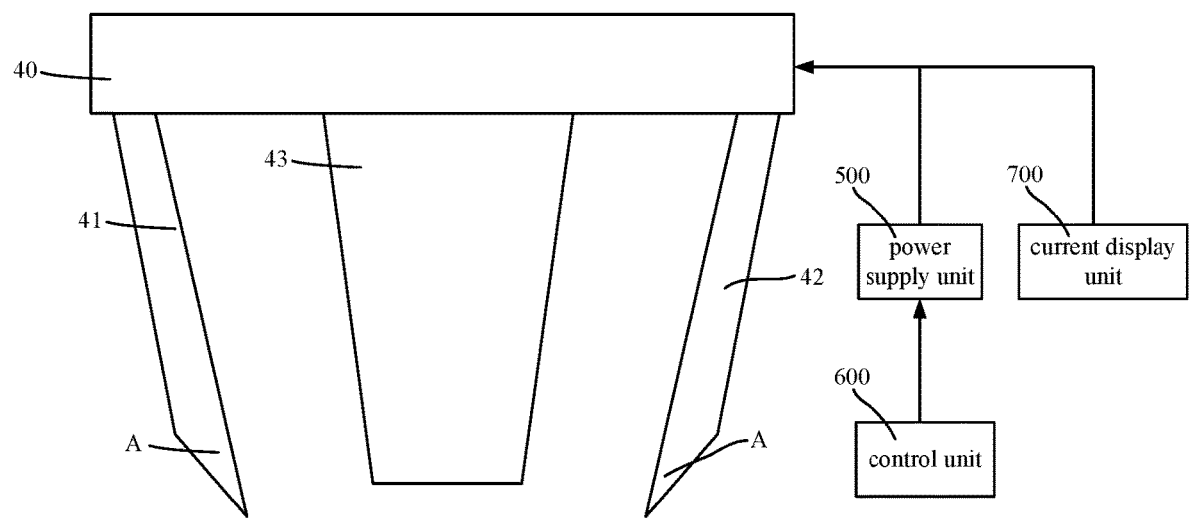
FIG. 11 schematically illustrates a structural diagram of a resistive soldering system according to an embodiment.

In an embodiment, a resistive soldering system is provided. Referring to FIG. 11, the resistive soldering system includes: a first electrode 41; a second electrode 42; a support cylinder 43; a resistive soldering joint 40 which is adapted to raise or lower the first electrode 41, the second electrode 42 and the support cylinder 43; and a power supply unit 500 which is connected with the first and second electrodes and adapted to supply power and a heating current to the first and second electrodes.

The resistive soldering system is described in detail in conjunction with figures below.

The support cylinder 43 is located between the first electrode 41 and the second electrode 42, so that during the resistive soldering process, the support cylinder 43 can be inserted into the through hole 13 of an antenna component, and the first electrode 41 and the second electrode 42 can contact with the antenna component, which may improve anti-relative-displacement ability of the antenna component and a glass. Besides, during the soldering process performed by the resistive soldering system, the support cylinder 43 applies a second pressure to the antenna component first, and the first electrode 41 and the second electrode 42 apply a first pressure to the antenna component afterwards, so that the support cylinder 43 fixes the antenna component first, which may improve accuracy of fixing the antenna component.

In some embodiments, the first electrode 41 and the second electrode 42 may include tungsten steel alloy. In some embodiments, the first electrode and the second electrode may include tungsten copper alloy.

Referring to FIGS. 6 to 9, FIGS. 6 to 9 schematically illustrate sectional structural diagrams of the first electrode, the second electrode and the support cylinder. To avoid affecting a shape of a cylindrical structure of the antenna component, the first electrode 41 and the second electrode 42 should only contact with a base structure of the antenna component but not contacting with a sidewall of the cylindrical structure of the antenna component during a soldering process of the antenna component and the glass performed by the resistive soldering system. Therefore, an angle D1 between the first electrode 41 and a horizontal plane is not greater than 90°, an angle D2 between the second electrode 42 and the horizontal plane is not greater than 90°, an angular distance between the first electrode 41 and the second electrode 42 gradually increases along a Z direction (not shown in Figures). In some embodiments, the angle D1 between the first electrode 41 and the horizontal plane may be within a range from 45° to 90°, and the angle D2 between the second electrode 42 and the horizontal plane may be within a range from 45° to 90°.

It should be noted that, the horizontal plane is parallel with a front surface of the base structure during the resistive soldering process, thus, an angle between the first electrode 41 and the front surface of the base structure may be considered as the angle between the first electrode 41 and the horizontal plane, and an angle between the second electrode 42 and the front surface of the base structure may be considered as the angle between the second electrode 42 and the horizontal plane.

In the embodiment, the angle D1 between the first electrode 41 and the horizontal plane is within a range from 55° to 80°, and the angle D2 between the second electrode 42 and the horizontal plane is within a range from 55° to 80°.

In the embodiment, the first electrode 41 has a falling wedge-shaped end A, and the second electrode 42 also has a falling wedge-shaped end A. As the antenna component has a relatively small size, a contact area between the first and second electrodes and the antenna component, when the falling wedge-shaped ends A of the first and second electrodes contact with the antenna component, may be reduced.

Referring to FIGS. 6 to 9, along a direction from a bottom to a top of the support cylinder 43, a diameter of the support cylinder 43 on a sectional surface parallel with the horizontal plane increases. Details about the support cylinder 43 can be found in the above description and are not described in detail here.

Referring to FIG. 9, in some embodiments, the support cylinder 43 includes a central axial structure 401 and a bump structure 402 on the periphery of the central axial structure 401. In some embodiments, the bump structure 402 may be an annular structure surrounding the periphery of the central axial structure 401. In some embodiments, the bump structure 402 may include at least two separate bumps.

In some embodiments, the resistive soldering system may further include: a control unit 600 connected with the power supply unit 500, wherein the control unit 600 may be adapted to control the power supply unit 500 to supply power to the first electrode 41 and the second electrode 42; and a current display unit 700 connected with the first electrode 41 and the second electrode 42, wherein the current display unit 700 is adapted to display a heating current flowing through the first electrode 41 and the second electrode 42.

In some embodiments, the resistive soldering system may further include: a support platform adapted to carry the glass and the antenna component to be soldered during a resistive soldering process; and a pre-heating treatment system adapted to perform a pre-heating treatment to solder, and the glass and the antenna component to be soldered before the resistive soldering process.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A resistive soldering method, comprising:
providing a glass and an antenna component which comprises a base structure and a cylindrical structure, wherein the base structure has a first surface to be soldered and a front surface opposite to the first surface to be soldered, and comprises a central portion and an edge portion surrounding the central portion, and the cylindrical structure is located on the central portion on the front surface of the base structure, and has a hole penetrating through a thickness of the cylindrical structure;
forming solder on a second surface to be soldered of the glass and/or the first surface to be soldered of the base structure;
performing a resistive soldering process to the second surface to be soldered of the glass and the first surface to be soldered of the base structure to melt the solder therebetween, wherein during the resistive soldering process, a first electrode and a second electrode are used to apply a first pressure and provide a heating current to the edge portion on the front surface of the base structure, and a support cylinder is inserted into the hole of the cylindrical structure and adapted to apply to the antenna component a second pressure for attaching the antenna component to the glass; and
after the resistive soldering process, performing a cooling treatment to the glass and the antenna component to cool the glass and the antenna component.

2. The method according to claim 1, wherein during the resistive soldering process, the support cylinder is further adapted to fix the antenna component to the glass.

3. The method according to claim 1, wherein the support cylinder is further adapted to reduce relative displacement of the antenna component and the glass.

4. The method according to claim 1, wherein the resistive soldering process comprises: the support cylinder being inserted into the hole of the cylindrical structure to apply to the antenna component the second pressure for attaching the antenna component to the glass; a first electrode and a second electrode being used to apply the first pressure to the edge portion on the front surface of the base structure; and providing the heating current.

5. The method according to claim 4, wherein the first electrode and the second electrode contact with the edge portion on the front surface of the base structure.

6. The method according to claim 4, wherein a pre-heating treatment is performed to the glass and the antenna component before the heating current is provided.

7. The method according to claim 6, wherein a heating temperature in the pre-heating treatment is within a range from 50° C. to 110° C.

8. The method according to claim 1, wherein a heating current is within a range from 120 A to 150 A.

9. The method according to claim 1, wherein during the cooling treatment, the first electrode and the second electrode are used to continue applying the first pressure to the edge portion on the front surface of the base structure, and the support cylinder is used to continue applying to the antenna component the second pressure for attaching the antenna component to the glass.

10. The method according to claim 1, wherein a time period of the resistive soldering process is within a range from 1.5 S to 3 S, and a time period of the cooling treatment is within a range from 4 S to 6 S.

11. The method according to claim 1, wherein the second pressure applied to the antenna component by the support cylinder is no less than 10N.

12. The method according to claim 1, wherein during the resistive soldering process, an angle between the first electrode and the front surface of the base structure is not greater than 90°, a distance between the first electrode and the cylindrical structure gradually increases along a direction from a bottom to a top of the hole of the cylindrical structure, an angle between the second electrode and the front surface of the base structure is not greater than 90°, and a distance between the second electrode and the cylindrical structure gradually increases along the direction from the bottom to the top of the hole of the cylindrical structure.

13. The method according to claim 12, wherein during the resistive soldering process, the angle between the first electrode and the front surface of the base structure is within a range from 45° to 90°, and the angle between the second electrode and the front surface of the base structure is within a range from 45° to 90°.

14. The method according to claim 1, wherein both the first electrode and the second electrode have a falling wedge-shaped end, and during the resistive soldering process, a tip of the falling wedge-shaped end of the first electrode and a tip of the falling wedge-shaped end of the second electrode contact with the edge portion on the front surface of the base structure.

15. The method according to claim 1, wherein the material of the support cylinder comprises a ceramic, resinous, metal or alloyed material.

16. The method according to claim 1, wherein the hole of the cylindrical structure is a through hole, and on a sectional surface parallel with the second surface to be soldered of the glass, a diameter of a first portion of the support cylinder being inserted into the through hole is smaller than a diameter of the through hole.

17. The method according to claim 16, wherein during the resistive soldering process, the support cylinder inserted into the through hole is in contact with the front surface of the base structure.

18. The method according to claim 16, wherein during the resistive soldering process, length of the first portion of the support cylinder being inserted into the through hole is smaller than or equal to depth of the through hole, and a top of the through hole is in contact with the support cylinder so that the top of the through hole gets stuck with the support cylinder.

19. The method according to claim 18, wherein along a direction from a bottom to the top of the hole of the cylindrical structure, a diameter of the first portion of the support cylinder being inserted into the hole gradually increases on a sectional surface parallel with the second surface to be soldered of the glass, and a diameter of a second portion of the support cylinder being contacting with the top of the hole is greater than a diameter of the top of the hole.

20. The method according to claim 18, wherein the support cylinder comprises a central axial structure and a bump structure on the periphery of the central axial structure, and during the resistive soldering process, a portion of the central axial structure below the bump structure is inserted into the through hole, and a bottom of the bump structure presses against the top of the through hole.

21. The method according to claim 20, wherein the bump structure is an annular structure surrounding the periphery of the central axial structure, or the bump structure comprises at least two separate bumps.

22. The method according to claim 1, wherein on a sectional surface parallel with the second surface to be soldered of the glass, the hole of the cylindrical structure has a diameter within a range from 3 centimeters to 5 centimeters, the cylindrical structure has a diameter within a range from 4 centimeters to 8 centimeters, and the base structure has a diameter within a range from 5 centimeters to 10 centimeters.

23. An assembly of antenna and glass, comprising:
an antenna component and a glass, wherein the assembly of antenna and glass is formed by the resistive soldering method according to claim 1.

24. The assembly of antenna and glass according to claim 23, wherein the edge portion on the front surface of the base structure has two pinholes.

* * * * *